(in US Patent 4,003,854, Jan. 18, 1977)

United States Patent [19]

Skvortsov et al.

[11] 4,003,854

[45] Jan. 18, 1977

[54] CATALYST OF SUPPORTED VANADIUM OXIDE AND MANGANESE OXIDE AND METHOD OF PRODUCING SAME

[76] Inventors: Gennady Alexeevich Skvortsov, ulitsa Kima, 32, kv. 50; Nellya Nikitichna Nizeeva, ulitsa Lermontova, 17, kv. 4; Avrum Iosifovich Podzharsky, ulitsa Juzhnaya, 12, kv. 10; Irma Viktorovna Dobrovolskaya, ulitsa Prokhodnoi tupik, 3, kv. 2a, all of Dneprodzerzhinsk Dnepropetrovskoi oblasti, U.S.S.R.

[22] Filed: June 3, 1974

[21] Appl. No.: 476,044

[52] U.S. Cl. .............................. 252/471; 252/461; 423/239

[51] Int. Cl.$^2$ ................ B01J 23/22; B01J 23/34

[58] Field of Search .......... 252/464, 471, 461, 456; 423/213.2, 239

[56] References Cited

UNITED STATES PATENTS

| | | | |
|---|---|---|---|
| 2,134,543 | 10/1938 | Andrews | 252/471 X |
| 3,025,132 | 3/1962 | Innes | 423/213.2 |
| 3,200,144 | 8/1965 | Baumgartner et al. | 252/471 X |
| 3,656,915 | 4/1972 | Tourtellotte | 423/213.2 |
| 3,699,683 | 10/1972 | Tourtellotte et al. | 423/213.2 |

Primary Examiner—W. J. Shine
Attorney, Agent, or Firm—Steinberg & Blake

[57] ABSTRACT

The catalyst for selective removal of nitrogen oxides from waste gases is actually vanadium oxide and manganese oxide applied to an inert carrier. Said metal oxides are taken in the weight ratio $V_2O_5/Mn_2O_3$ of 0.1 – 30:1, the total weight of the metal oxides being 5 – 40 per cent of the total weight of the catalyst.

The proposed catalyst is prepared by dissolving ammonium metavanadate or vanadium pentoxide in an aqueous solution of oxalic acid having a concentration of 10 to 360 g/liter. A hydro-soluble salt of manganese is then dissolved in the obtained solution of ammonium oxalate-vanadate or oxalate-vanadic acid, the manganese salt being taken in such a quantity that the weight ratio of ammonium oxalate-vanadium or oxalate-vanadic acid to the manganese salt should be from 0.1 to 30:1 calculating with reference to the ratio of the metal oxides $V_2O_5/Mn_2O_3$. The thus-prepared solution is used to impregnate an inert carrier, which is then dried at a temperature of 110° – 120° C, and calcined at a temperature from 400° to 600° C. Said operations of impregnating, drying, and calcining are performed at least once.

4 Claims, No Drawings

CATALYST OF SUPPORTED VANADIUM OXIDE AND MANGANESE OXIDE AND METHOD OF PRODUCING SAME

This invention relates to a catalyst for selective removal of nitrogen oxides from waste gases and to a method of preparing the same.

The said catalyst can be used to remove nitrogen oxides from various waste gases discharged into the atmosphere in the manufacture, for example, of nitric acid, sulphuric acid, sodium and ammonium nitrites, certain catalysts, and products of organic synthesis.

It is known that waste gases discharged into the atmosphere in the manufacture of nitric acid, contain, due to incomplete conversion of nitrogen oxides into nitric acid, about 0.05 – 0.5 per cent by volume of nitrogen oxides and 3 – 6 percent of oxygen.

Waste gases, in the production of some products of organic synthesis and catalysts, contain nitrogen oxides amounting to as much as 1 per cent by volume.

From the standpoint of health such waste gases cannot be discharged into the atmosphere without the preliminary removal of nitrogen oxides.

In the known methods for catalytic purification of waste gases from nitrogen oxides in the presence of agents that reduce nitrogen oxides, such as combustible gases (hydrogen, carbon monoxide, methane, and other unsaturated hydrocarbons), use is made of catalysts containing precious metals, for example, palladium, rhodium, ruthenium, and platinum. In addition to nitrogen oxides, oxygen is also removed from waste gases, which increases requirements for reducing gas.

It is known that ammonia selectively reacts with nitrogen oxides in the presence of oxygen. By selectivity it is understood that nitrogen oxides can be reduced on catalysts in the presence of oxygen irrespective of its content in the impure gas. However, selectivity of the process is determined by the type of the particular catalyst used.

Known in the prior art are catalysts for selective removal of nitrogen oxides from waste gases in the presence of ammonia, which actually are metals of the platinum group.

Disadvantages inherent in the known catalysts reside in the fact that the activity of such catalysts is deteriorated by the action of ammonia and that they are expensive metals.

Known also is the method in which oxides of cobalt, nickel and iron, applied to a carrier are used in the catalytic removal of nitrogen oxides from waste gases in the presence of ammonia. These catalysts are supported on alumina. Known also are tabletted oxides of vanadium, manganese, iron; mixture of molybdenum oxides and vanadium; mixtures of oxides of iron, zinc and manganese; chromites of copper and of manganese, which all are used as the catalysts for the same purpose.

In the manufacture of a catalyst from vanadium oxides, the starting salt, ammonium metavanadate, is decomposed at a temperature of 350° C. The obtained vanadium pentoxide is mixed with an organic binder, for example, adhesive, and pressed into tablets.

Known is a catalyst for selective removal of nitrogen oxides from waste gases, which is vanadium oxide applied to an inert carrier, for example corundum, silicic acid, $\alpha$ - $Al_2O_3$. The said catalyst is prepared by impregnating the carrier with a solution of the salt containing vanadium, with subsequent drying and calcining the impregnated carrier until vanadium oxide is prepared.

In purification of waste gas having the composition, in percent by volume, $O_2$ 3.5, NO 0.43, $NH_3$ 0.43, nitrogen being the balance, in the presence of a catalyst which is vanadium oxide taken in the quantity of 6.8 per cent by weight, applied to corundum, at a volumetric velocity of the waste gas passage of 10,000 hour$^{-1}$, the attainable degree of waste gas purification from nitrogen oxides, at a temperature of 170° C, is 88.9 percent, at a temperature of 220° C, 97.5 percent, and at 258° C, 99.2 percent.

In purification of waste gas having the composition, in percent by volume, $O_2$ 2.9 – 3.3, NO 0.24 – 0.26, $NH_3$ 0.5, nitrogen being the balance in the presence of a catalyst, which is vanadium oxide supported on $\alpha$ - $Al_2O_3$, at a volume velocity of the waste gas of 20000 hour$^{-1}$, the quantity of ammonia 2.19 – 2.48 times exceeding the stoichiometric, the degree of waste gas purification from nitrogen oxides, at a temperature of 285° C, is 91.5 percent and at a temperature of 351° C, 96.2 percent.

Thus, the high degree of waste gas purification from nitrogen oxides in the presence of said catalysts, is attained only within a narrow range of temperatures, and at considerable excess of ammonia as compared with the stoichiometric quantity.

The object of this invention is to provide a catalyst which would possess high activity and selectivity, and would retain them over a wide range of temperatures.

Another object of the invention is to provide a method for preparing the catalyst that would ensure strength and intactness of the superficial layer of the carrier, and would enable uniform distribution of the active components on the carrier superficial layer.

In accordance with these and other objects, the invention consists in that the catalyst for selective removal of nitrogen oxides from waste gases is actually oxides of vanadium and of manganese applied to an inert carrier, the weight ratio of the metal oxides $V_2O_5/Mn_2O_3$ being 0.1 – 30:1 and the total quantity of the metal oxides being 5 – 40 percent of the total weight of the catalyst.

It is recommended that the total content of oxides of vanadium and manganese in the catalyst should be from 10 to 25 percent by weight.

According to the invention, the method of preparing said catalyst consists in that ammonium metavanadate or vanadium pentoxide is dissolved in an aqueous solution of oxalic acid having a concentration of 10 – 360 g/litre and into the thus-prepared solution of ammonium oxalate vanadate, or oxalate-vanadic acid, is added a hydro-soluble salt of manganese taken in the weight ratio of ammonia oxalate-vanadate, or oxalate-vanadic acid to the manganese salt of 0.1 – 30:1 calculating with reference to the metal oxides $V_2O_5/Mn_2O_3$; the thus-obtained solution is used to impregnate an inert carrier, the carrier is then dried at 110° – 120°, and calcined at a temperature of 400° – 600° C, the steps of impregnating, drying and calcining being carried out at least one time.

Owing to the presence in the catalyst of manganese oxide, and also due to the specific weight ratio of the oxides of vanadium and manganese, the proposed catalyst possesses high activity which makes it possible to attain a high degree of purification of waste gases from nitrogen oxides (to 99 percent) at temperatures within a wide range (from 200° to 400° C), while the high selectivity of the catalyst makes it possible to reduce the requirement for ammonia almost to stoichiometric quantity.

Another important advantage of the proposed catalyst, compared with the known catalysts, is that it makes it possible also to completely remove nitrogen oxides from waste gases (to 0.001 0.005 percent by residual volumetric content), the ammonia content of the purified gas being less than 0.01 percent by volume.

The proposed catalyst makes it possible to carry out the process of waste gas purification from nitrogen oxides in the presence of sulphur dioxide, chlorine and carbon monoxide, the activity of the catalyst not being impaired in the presence of these admixtures.

The method of preparing the proposed catalyst preserves the strength and structure of the superficial layer of the carrier and ensures uniform distribution of the metal oxides over the superficial layer of the carrier.

The method of preparing the catalyst according to the invention should preferably be realized as follows.

A reaction vessel with a stirrer is loaded with a pre-calculated quantity of distilled water, into which, with stirring, is added the required quantity of oxalic acid. While preparing a solution of oxalic acid, having the concentration over 200 g/litre, it is not necessary to ensure its complete dissolution, since the precipitate will gradually pass into solution while oxalic acid reacts with vanadium-containing compounds.

The obtained solution is mixed thoroughly and ammonium metavanadate, or vanadium pentoxide, is gradually added.

In the reaction between oxalic acid and ammonium metavanadate $$2NH_4VO_3 + 4H_2C_2O_4 = (NH_4)_2[V_2O_2(C_2O_4)_3] + 4H_2O + 2CO_2 \quad (1)$$

a readily soluble ammonium oxalate vanadate is formed.

If vanadium pentoxide reacts with oxalic acid $$V_2O_5 + 4H_2C_2O_4 = H_2[V_2O_2(C_2O_4)_3] + 3H_2O + 2CO_2 \quad (2)$$

oxalate-vanadic acid which is also readily soluble in water, is formed.

In order to prepare a homogeneous solution, oxalic acid, ammonium metavanadate, or vanadium pentoxide, are taken in stoichiometric quantities according to reactions (1) and (2). In order to accelerate the reaction, the solution is heated to 70° C. As soon as the reaction between the components is ended, and the liberation of carbon dioxide stopped, a pre-calculated quantity of a hydro-soluble salt of manganese is added to the solution. Manganese chloride, $MnCl_2 \cdot 4H_2O$, manganese nitrate $Mn(NO_3)_2 \cdot 6H_2O$, or manganese acetate $Mn(CH_3COO)_2 \cdot 4H_2O$ can be used as the water-soluble manganese salt.

The solution is mixed thoroughly and the necessary quantity of inert carrier dried at a temperature of 110° C for five hours is loaded into it. $\gamma Al_2O_3$, $\alpha$-$Al_2O_3$, quartz, chamotte, or silica gel can be used as the carrier.

The carrier is soaked in the solution for 20 – 60 minutes at temperatures within the range from 20° to 70° C, depending on the particular type of the carrier. The impregnated carrier is dried at a temperature of 110° – 120° C for three to eight hours, and calcined in a current of air at a temperature from 400° to 600° C for five to ten hours. In some cases, depending on the moisture-absorbing power of the carrier, and on the required composition of the catalyst, the operations of impregnating the carrier, its drying and calcining can be repeated many times.

For a better understanding of the invention, the following examples of its practical embodiment are given by way of illustration.

EXAMPLE 1

The catalyst having the composition, in percent by weight, $V_2O_5$ 1, $Mn_2O_3$ 10, $\gamma$-$Al_2O_3$ 89, the total quantity of the oxides of vanadium and manganese being 11 percent by weight with the weight ratio $V_2O_5/Mn_2O_3$ of 0.1:1, is prepared as follows. First prepared is a solution of oxalic acid, for which purpose 3.07 g of oxalic acid are dissolved with stirring in 100 ml of distilled water to prepare the acid having the concentration of 21.9 g/litre. Then 1.42 g of ammonium metavanadate are added with stirring to the obtained acid solution. Next 27.8 g of manganese chloride are added, this quantity being selected so that the weight ratio of ammonium oxalate-vanadate to the manganese salt (calculated as the ratio of the metal oxides $V_2O_5/Mn_2O_3$) should be 0.1. As soon as manganese chloride has been dissolved, 100 g of the carrier $\gamma$-$Al_2O_3$, dried at a temperature of 110° C for five hours, are added to the solution and soaked in it at a temperature of 30° – 40° C for forty minutes. The carrier is then dried and calcined at a temperature of 400° – 600° C. The catalyst specimens having grains sizing 2 – 3 mm are tested on a laboratory plant at atmospheric pressure, volumetric velocity of the gas passage of 10000 hour$^{-1}$, in the process of reducing nitrogen oxides with ammonia.

To that end an artificially prepared mixture, consisting, in percent by volume, of NO 0.2 – 0.3, $NO_2$ 0.1 – 0.12, $NH_3$ 0.34 – 0.50, $O_2$ 4 – 6, nitrogen being the balance, is used.

The volumetric ratio of ammonia to nitrogen oxides $$\frac{V_{NH_3}}{V_{NO} + V_{NO_2}}$$

in the gaseous mixture is 1.1 – 1.2:1.

This gaseous mixture is passed through a bed of the catalyst at various temperatures. The treated gas is analyzed to determine residual nitrogen oxides and the degree of purification. The experimental data indicate, that within the range of temperatures from 200° to 320° C, the degree of gas purification from nitrogen oxides is 96 – 98 percent, and the selectivity of the catalyst is 85 – 90 percent.

| Temperature, ° C | Purification degree, % | Selectivity, % |
|---|---|---|
| 200 | 96 | 90 |
| 240 | 97 | 85 |
| 260 | 98 | 85 |
| 220 | 98 | 85 |
| 320 | 97 | 85 |
| 360 | 90 | 80 |

EXAMPLE 2

The catalyst having the composition, in percent by weight, $V_2O_5$ 6, $Mn_2O_3$ 6, $\gamma$-$Al_2O_3$ 88, the total content of the oxides of vanadium and manganese being 12 percent by weight, and at the weight ratio $V_2O_5/Mh_2O_3$ of 1:1, is prepared as follows. First a solution of oxalic acid having the concentration 133 g/litre is prepared by dissolving 18.6 g of oxalic acid in 100 ml of distilled water, and then, with thoroughly stirring the solution, are added first 8.65 g of ammonium metavanadate and then 16.82 g of manganese chloride. The weight ratio of ammonium oxalate-vanadate to the manganese salt, calculated as the ratio of the metal oxides $V_2O_5/Mn_2O_3$, should be 1.

The further operations for preparing the catalyst, and also the conditions for testing it, are the same as described in Example 1.

| Temperature, ° C | Degree of purification, % | Selectivity, % |
|---|---|---|
| 200 | 82 | 100 |
| 240 | 94 | 88 |
| 280 | 97 | 85 |
| 320 | 92 | 83 |
| 360 | 90 | 80 |

EXAMPLE 3

The catalyst having the composition, in percent by weight: $V_2O_5$ 15, $Mn_2O_3$ 0.5, $\gamma$-$Al_2O_3$ 84.5, the total quantity of the oxides of vanadium and manganese being 15.5 percent by weight, at the weight ratio $V_2O_5/Mn_2O_3$ of 30:1, is prepared by a procedure similar to that described in Example 1.

To that end, first 22.25 g of ammonium metavanadate, and then 1.45 g of manganese chloride are dissolved in 100 ml of an aqueous solution of oxalic acid having the concentration of 350 g/litre. The weight ratio of ammonium oxalate-vanadate to the manganese salt in the obtained solution (calculated as the ratio of the metal oxides $V_2O_5/Mn_2O_3$) is 30.

The further procedure for preparing the catalyst and also its testing are the same as described in Example 1.

According to the data obtained, in the range of temperatures from 140° to 400° C, the degree of gas purification from nitrogen oxides is 92 – 99 percent, and the degree of selectivity is 75 – 100 percent.

| Temperature, ° C | Purification degree, % | Selectivity, % |
|---|---|---|
| 120 | 88 | 100 |
| 140 | 95 | 100 |
| 160 | 98 | 98 |
| 180 | 97 | 98 |
| 200 | 99 | 95 |
| 300 | 97 | 88 |
| 400 | 92 | 75 |
| 500 | 90 | 70 |

EXAMPLE 4

The catalyst having the composition, in percent by weight: $V_2O_5$ 30, $Mn_2O_3$ 10, $\gamma$-$Al_2O_3$ 60, the total quantity of the oxides of vanadium and manganese being 40 percent by weight at the weight ratio $V_2O_5/Mn_2O_3$ of 3:1, is prepared as follows.

First 55 g of ammonium metavanadate and then 35 g of manganese chloride are dissolved in 300 ml of an aqueous solution of oxalic acid having the concentration of 290 g/litre.

The weight ratio of ammonium oxalate-vanadate to the manganese salt in the obtained solution (calculated as the ratio of the metal oxides $V_2O_5/Mn_2O_3$) is 3. The further procedure for preparing the catalyst and testing it is as described in Example 1, and after calcining, all operations, beginning with impregnation, are repeated once more.

The thus-prepared catalyst is tested as described in Example 1.

The degree of gas purification from nitrogen oxides at a temperature of 280° C, is 97 percent.

EXAMPLE 5

The catalyst having the composition, in percent by weight, $V_2O_5$ 4, $Mn_2O_3$ 1, $\gamma$-$Al_2O_3$ 95, the total content of the oxides of vanadium and manganese being 5 percent at the weight ratio $V_2O_5/Mn_2O_3$ of 4:1, is prepared as described in Example 1, by dissolving first 5.6 g of ammonium metavanadate and then 2.63 g of manganese chloride in 100 ml of an aqueous solution of oxalic acid having the concentration of 87 g/litre. The weight ratio, in the obtained solution, of ammonium oxalate-vanadate to the manganese salt, calculated as the ratio of the metal oxides, is 4:1. The further procedure for preparing and testing the catalyst are the same as described in Example 1.

The degree of gas purification from nitrogen oxides, at a temperature of 280° C, is 96 percent.

EXAMPLE 6

The catalyst, having the composition, in percent by weight: $V_2O_5$ 5, $Mn_2O_3$ 1, quartz 95, the total content of the oxides of vanadium and manganese being 5 percent by weight at the weight ratio $V_2O_5/Mn_2O_3$ of 4:1, is prepared and tested as described in Example 1.

The degree of gas purification from nitrogen oxides, at a temperature of 280° C, is 88 percent.

EXAMPLE 7

The catalyst having the composition, in percent by weight: $V_2O_5$ 4, $Mn_2O_3$ 1, silica gel 95, the total quantity of the oxides of vanadium and manganese being 5 percent at the weight ratio $V_2O_5/Mn_2O_3$ of 4:1, is prepared and tested as described in Example 1.

The degree of gas purification, at a temperature of 280° C, is 92 percent.

EXAMPLE 8

The catalyst having the composition, in percent by weight: $V_2O_5$ 4, $Mn_2O_3$ 1, chamotte 95, the total quantity of the oxides of vanadium and manganese being 5 percent by weight at the weight ratio $V_2O_5/Mn_2O_3$ of 4:1, is prepared and tested as described in Example 1.

The degree of gas purification from nitrogen oxides, at a temperature of 280° C, is 90 percent.

EXAMPLE 9

The catalyst having the composition, in percent, by weight: $V_2O_5$ 4, $Mn_2O_3$ 1, $\alpha$-$Al_2O_3$ 95, the total quantity of the oxides of vanadium and manganese being 5 percent by weight at the weight ratio $V_2O_5/Mn_2O_3$ of 4:1, is prepared and tested as described in Example 1.

The purification of gas from nitrogen oxides, at a temperature of 280° C, is 95 percent.

EXAMPLE 10

The catalyst having the composition as specified in Example 4, is prepared as described in Example 4, by dissolving 42 g of vanadium pentoxide and 35 g of manganese chloride in 300 ml of an aqueous solution of oxalic acid having the concentration of 290 g/litre.

The obtained catalyst is tested as described in Example 1.

The purification degree, at a temperature of 280° C, is 98%.

EXAMPLE 11

The catalyst having the composition as specified in Example 3, is prepared by a procedure described in Example 1, by dissolving first 22.25 g of ammonium metavanadate and then 2.09 g of manganese nitrate in an aqueous solution of oxalic acid having the concentration of 350 g/litre. The further procedure for preparing the catalyst and testing it, is the same as described in Example 1. The gas purification degree, at a temperature of 280° C, is 98 percent.

EXAMPLE 12

The catalyst having the composition as in Example 3, is tested by a procedure described in Example 1, at a temperature of 260° C, only changing the volumetric ratio of ammonia to nitrogen oxides in the starting gas.

According to the data obtained, at the oxidation degree of nitrogen oxide of 30 percent, the optimum volumetric ratio of ammonia to nitrogen oxides is 1 – 1.1:1. Under these conditions the degree of gas purification from nitrogen oxides is 95.6 – 97.6 percent, the total content of ammonia in the purified gas being 0.003 – 0.005 percent by volume.

EXAMPLE 13

The catalyst having the composition as in Example 4 is tested according to procedure described in Example 1, at a temperature of 260° C, at various volumetric velocites of the waste gas passage and at various volumetric ratios of ammonia to nitrogen oxides in the waste gas.

According to the data obtained, at volumetric velocities within the range from 10000 to 50000 hour$^{-1}$, the degree of waste gase purification from nitrogen oxides is 96.8 to 99.5 percent by volume.

| Volumetric velocity of waste gas, hour$^{-1}$ | Nitrogen oxides and ammonia content of waste gas, in per cent by volume | | | | Purification, % | $V_{NH_3}/V_{NO+NO_2}$ |
|---|---|---|---|---|---|---|
| | before contact | | after contact | | | |
| | $C_{NO+NO_2}$ | $C_{NH_3}$ | $C'_{NO}$ | $C'_{NH_3}$ | | |
| 10000 | 0.217 | 0.231 | 0.0033 | 0.0055 | 98.4 | 1.06 |
| 20000 | 0.137 | 0.157 | 0.0017 | 0.0270 | 98.7 | 1.14 |
| 30000 | 0.108 | 0.121 | 0.0005 | 0.0135 | 99.5 | 1.12 |
| 50000 | 0.152 | 0.168 | 0.0050 | 0.0171 | 96.8 | 1.1 |
| 80000 | 0.100 | 0.118 | 0.020 | 0.0140 | 80.0 | 1.18 |

EXAMPLE 14

The catalyst is prepared as in Example 3 and tested in industrial conditions by passing waste gases at a rate of 20000 cu.m/hour at a pressure of 2.5 kg/sq.cm.

The composition of waste gas, in volume percent: NO 0.08 – 0.20, $NO_2$ 0.045 – 0.10, $O_2$ 4 – 5, $H_2O$ 1 – 2, nitrogen being the balance.

The results of the industrial test are tabulated below.

| Volumetric velocity of waste gas hour$^{-1}$ | Gas temperature ° C | | Nitrogen oxides and ammonia content of waste gas, % vol. | | | Purification degree, % | $V_{NH_3}/V_{NO+NO_2}$ |
|---|---|---|---|---|---|---|---|
| | before contact | after contact | before contact | after contact | | | |
| | | | $C_{NO+NO_2}$ | $C'_{NO}$ | $C'_{NH_3}$ | | |
| 6500 | 269 | 295 | 0.295 | 0.0057 | 0.0081 | 97.5 | 1.09 |
| 15,000 | 261 | 270 | 0.116 | 0.0046 | 0.0057 | 96 | 1.08 |
| 30,000 | 263 | 276 | 0.124 | 0.0034 | 0.007 | 97.3 | 1.2 |

EXAMPLE 15

Through the catalyst prepared in Example 3, is passed at a volumetric velocity of 10000 hour$^{-1}$, and various temperatures waste gas having the composition, in percent by volume: $SO_2$ 0.045 – 0.166, No 0.110, $NH_3$ 0.11 – 0.12, $O_2$ 10, nitrogen being the balance.

| $V_{NH_3}/V_{NO+NO_2}$ | Nitrogen oxides and ammonia content of waste gas, in % by volume | | | | Purification degree, % |
|---|---|---|---|---|---|
| | before contact | | after contact | | |
| | $C_{NO+NO_2}$ | $C_{NH_3}$ | $C'_{NO}$ | $C'_{NH_3}$ | |
| 0.9 | 0.14 | 0.126 | 0.022 | 0.0015 | 84.5 |
| 1.0 | 0.16 | 0.16 | 0.007 | 0.003 | 95.6 |
| 1.1 | 0.20 | 0.22 | 0.005 | 0.005 | 97.6 |
| 1.2 | 0.22 | 0.264 | 0.002 | 0.02 | 99.3 |
| 1.4 | 0.18 | 0.252 | 0.002 | 0.04 | 99.0 |

The degree of gas purification from nitrogen oxides at a temperature of 200° C is 99.8 percent, at 320° C 98.2 percent.

| t° C | Nitrogen oxides, ammonia, and sulphur dioxide content of waste gase, in per cent by volume | | | | | | $V_{NH_3}/V_{NO}$ | Purification % |
|---|---|---|---|---|---|---|---|---|
| | before contact | | | after contact | | | | |
| | $C_{SO_2}$ | $C_{NO}$ | $C_{NH_3}$ | $C'_{SO_2}$ | $C'_{NO}$ | $C'_{NH_3}$ | | |
| 200 | 0.127 | 0.101 | 0.110 | 0.130 | 0.0002 | 0.0005 | 1.1 | 99.8 |
| 280 | 0.045 | 0.115 | 0.120 | 0.045 | 0.002 | 0.005 | 1.05 | 98.1 |
| 320 | 0.166 | 0.110 | 0.110 | 0.166 | 0.002 | 0.007 | 1.0 | 98.2 |

EXAMPLE 16

Through the catalyst prepared in Example 3, is passed at a space rate of 10,000 hour$^{-1}$, waste gas having the composition, in percent by volume: $Cl_2$ 0.113 – 0.330, $NO_2$ 0.100, $NH_3$ 0.140, $O_2$ 21, nitrogen being the balance at a temperature of 350° C. The degree of gas purification from nitrogen oxides is 98 – 100 percent.

| Nitrogen oxides, ammonia and chlorine content of waste gas, in per cent by volume | | | | | | $V_{NH_3}/V_{NO_2}$ | Purification degree, % |
|---|---|---|---|---|---|---|---|
| before contact | | | after contact | | | | |
| $C_{Cl_2}$ | $C_{NO_2}$ | $C_{NH_3}$ | $C'_{Cl_2}$ | $C'_{NO_2}$ | $C'_{NH_3}$ | | |
| 0.330 | 0.103 | 0.140 | 0.330 | 0.002 | 0.00 | 1.4 | 97.7 |
| 0.113 | 0.096 | 0.140 | 0.100 | 0.000 | 0.0006 | 1.4 | 100 |

WE CLAIM:

1. A catalyst for selective removal of nitrogen oxides from waste gases, said catalyst consisting essentially of a mixture oxides of vanadium and of manganese applied to an inert carrier, said oxides being taken in the weight ratio $V_2O_5/Mn_2O_3$ of 0.1 – 30:1, the total content of the metal oxides being 5 – 40 percent of the total weight of the catalyst.

2. A catalyst according to claim 1, in which the total content of the oxides of vanadium and manganese is 10 – 25 percent of the total weight of the catalyst.

3. Method of producing a catalyst for selective removal of nitrogen oxides from waste gases and consisting essentially of a mixture of oxides of vanadium and manganese applied to an inert carrier, said oxides being taken in the weight ratio $V_2O_5/Mn_2O_3$ of 0.1 – 30:1, the total content of the metal oxides being 5 – 40 percent of the total weight of the catalyst, which comprises dissolving a compound selected from the group consisting of ammonium metavanadate and vanadium pentoxide in an aqueous solution of oxalic acid having a concentration of 10 – 360 g/l, adding a water soluble salt of manganese to the thus formed solution in an amount such that the ratio by weight of the formed oxylate-vanadium compound to the manganese salt is between 0.1 – 30:1, calculated with reference to the ratio of the metal oxides $V_2O_5/Mn_2O_3$, impregnating an inert carrier with the thus obtained solution, and subjecting the thus impregnated carrier to at least one drying operation at a temperature of 110°–120° C and at least one calcining operation at a temperature of 400° – 600° C.

4. The catalyst for selective removal of nitrogen oxides from waste gases produced by the method of claim 3.